US012688284B2

(12) United States Patent
Mirsky et al.

(10) Patent No.: US 12,688,284 B2
(45) Date of Patent: Jul. 21, 2026

(54) ADAPTIVE TEXTUAL PAYLOADS FOR DISRUPTING LLM-POWERED CYBERATTACKS

(71) Applicant: Radware Ltd., Tel Aviv (IL)

(72) Inventors: Yisroel Avraham Mirsky, Be'erSheva (IL); Daniil Ayzenshteyn, Be'erSheva (IL); Roy Lazar Weiss, Be'erSheva (IL)

(73) Assignee: Radware Ltd., Tel Aviv (IL)

( * ) Notice: Subject to any disclaimer, the term of this patent is extended or adjusted under 35 U.S.C. 154(b) by 0 days.

(21) Appl. No.: 19/350,926

(22) Filed: Oct. 6, 2025

(65) Prior Publication Data

US 2026/0099595 A1    Apr. 9, 2026

Related U.S. Application Data

(60) Provisional application No. 63/773,575, filed on Mar. 18, 2025, provisional application No. 63/704,041, filed on Oct. 7, 2024.

(51) Int. Cl.
G06F 21/55        (2013.01)
(52) U.S. Cl.
CPC ...... G06F 21/554 (2013.01); G06F 2221/034 (2013.01)
(58) Field of Classification Search
CPC .......................... G06F 21/554; G06F 2221/034
See application file for complete search history.

(56) References Cited

U.S. PATENT DOCUMENTS

| | | | | |
|---|---|---|---|---|
| 12,174,954 | B1 * | 12/2024 | Yeung | G06N 3/0455 |
| 12,519,817 | B2 * | 1/2026 | Trabelsi | G06N 3/084 |
| 2024/0333765 | A1 * | 10/2024 | McGrew | G06F 16/334 |
| 2025/0165618 | A1 * | 5/2025 | Cameron | G06F 21/552 |
| 2025/0165755 | A1 * | 5/2025 | Gates | G06N 3/0475 |
| 2025/0181836 | A1 * | 6/2025 | Mehrotra | G06F 21/577 |
| 2025/0337775 | A1 * | 10/2025 | Kawasaki | H04L 63/1416 |

OTHER PUBLICATIONS

Sladić, Muris, et al. "LIm in the shell: Generative honeypots." 2024 IEEE European Symposium on Security and Privacy Workshops (EuroS&PW). IEEE, 2024. (Year: 2024).*

(Continued)

*Primary Examiner* — Michael R Vaughan
(74) *Attorney, Agent, or Firm* — M&B IP Analysts, LLC

(57) ABSTRACT

A system and method for defending against cyberattacks executed by one or more large language model (LLM)-powered agents presented. The method includes deploying one or more traps throughout a computing environment to protect at least one protected entity, wherein each trap of the one or more traps is designed to exploit one or more vulnerabilities of a LLM contained within an LLM-powered agent; monitoring, in real-time, a plurality of interactions with the deployed traps; detecting, based on the monitored plurality of interactions, interaction behavior consistent with that of at least one LLM-powered agent of the one or more LLM-powered agents; and responsive to the detection, causing one or more of the deployed traps to initiate one or more defensive actions.

27 Claims, 4 Drawing Sheets

(56) References Cited

OTHER PUBLICATIONS

Stamelos, Ioannis, George Hatzivasilis, and Sotiris Ioannidis. "Active Honey Files for Ransomware Encryption Mitigation." 2024 IEEE International Conference on Cyber Security and Resilience (CSR). IEEE, 2024. (Year: 2024).*
Timmer, Roelien C., et al. "Honeyfile camouflage: Hiding fake files in plain sight." Proceedings of the 3rd ACM Workshop on the Security Implications of Deepfakes and Cheapfakes. 2024. (Year: 2024).*
Fang, Richard, et al. "Llm agents can autonomously hack websites." arXiv preprint arXiv:2402.06664 (Year: 2024).*
Abramovich, Talor, et al. EnIGMA: Interactive Tools Substantially Assist LM Agents in Finding Security Vulnerabilities, arXiv (Jun. 5, 2025).
Abu-Dabaseh, Farah, et al. Automated Penetration Testing: An Overview, CS & IT-CSCP (Computer Science & Information Technology) (2018), 121-129.
An, Shengnan, et al. Make Your LLM Fully Utilize the Context, arXiv (Apr. 26, 2024).
Boucher, Nicholas, et al. Bad Characters: Imperceptible NLP Attacks, IEEE (43rd IEEE Symposium on Security and Privacy) (Dec. 11, 2021).
Colorize linux programs output, MyBlueLinux.com (last accessed Oct. 25, 2025).
Deng, Gelei, et al. PentestGPT: Evaluating and Harnessing Large Language Models for Automated Penetration Testing, Philadelphia, PA, USA (Aug. 14-16, 2024).
Fang, Richard, et al. LLM Agents can Autonomously Hack Websites, arXiv (Feb. 16, 2024).
Gallegos, Isabel O., et al. Bias and Fairness in Large Language Models: A Survey, Association for Computational Linguistics, arXiv (Jul. 12, 2024).
Gao, Bin, et al. Cost-Efficient Large Language Model Serving for Multi-turn Conversations with CachedAttention, Santa Clara, CA, USA (Jul. 2024).
Gemini Team, Gemini 1.5: Unlocking multimodal understanding across millions of tokens of context, Google DeepMind (Dec. 16, 2024).
Gioacchini, Luca, et al. Autopenbench: Benchmarking Generative Agents for Penetration Testing, arXiv (Oct. 28, 2024).
Goyal, Dhruva, et al. Hacking, The Lazy Way: LLM Augmented Pentesting, arXiv (May 19, 2025).
Gupta, Maanak, et al. From ChatGPT to ThreatGPT: Impact of Generative AI in Cybersecurity and Privacy, IEEE (IEEE Access vol. 11) (Aug. 1, 2023).
Happe, Andreas, et al. LLMs as Hackers: Autonomous Linux Privilege Escalation Attacks, arXiv (Oct. 15, 2025).
He, Pengcheng, et al. DEBERTAV3: Improving DeBERTa Using ELECTRA-Style Pre-Training with Gradient-Disentangled Embedding Sharing, ICLR (Mar. 24, 2023).
Huang, Dong, et al. Bias Testing and Mitigation in LLM-based Code Generation, arXiv (Mar. 21, 2025).
Huang, Junjie, et al. PenHeal: A Two-Stage LLM Framework for Automated Pentesting and Optimal Remediation, ACM, Salt Lake City, Utah, USA (Oct. 2024).
Huang, Lei, et al. A Survey on Hallucination in Large Language Models: Principles, Taxonomy, Challenges, and Open Questions, ACM Transactions on Information Systems vol. 1 No. 1, (Jan. 2024).
Javadpour, Amir, et al. A comprehensive survey on cyber deception techniques to improve honeypot performance, Elsevier (Computers & Security 140) (Mar. 1, 2024).
Jiang, Albert Q., et al. Mistral 7B, arXiv (Oct. 10, 2023).
Jiang, Yibo, et al. On the Origins of Linear Representations in Large Language Models, Vienna, Austria, International Conference on Machine Learning 2024 (PMLR 235) (2024).
Kuratov, Yuri, et al. BABILong: Testing the Limits of LLMs with Long Context Reasoning-in-a-Haystack, NeurIPS (2024).

Land, Sander, et al. Fishing for Magikarp: Automatically Detecting Under-trained Tokens in Large Language Models, Association for Computational Linguistics (EMNLP 2024)(Nov. 12-16, 2024), 11631-11646.
Lee, Katherine, et al. Deduplicating Training Data Makes Language Models Better, Association for Computational Linguistics (ACL 2022)(May 22-27, 2022), 8424-8445.
Lin, Stephanie, et al. TruthfulQA: Measuring How Models Mimic Human Falsehoods, Association for Computational Linguistics (ACL vol. 1 2022) (May 22-27, 2022), 3214-3252.
Liu, Nelson F., et al. Lost in the Middle: How Language Models Use Long Contexts, Association for Computational Linguistics (Transactions of the Association for Computational Linguistics vol. 12) (Feb. 2024), 157-173.
Liu, Yupei, et al. Formalizing and Benchmarking Prompt Injection Attacks and Defenses, Philadelphia, PA, USA, Usenix (33rd USENIX Security Symposium), (Aug. 14-16, 2024).
Llama Team, The Llama 3 Herd of Models, Meta (Jul. 23, 2024).
Mehrabi, Ninareh, et al. A Survey on Bias and Fairness in Machine Learning, arXiv (Jan. 25, 2022).
Mirsky, Yisroel, et al. The Threat of Offensive AI to Organizations, Elsevier (Computers & Security 124) (2023).
Mo, Yichuan, et al. Fight Back Against Jailbreaking via Prompt Adversarial Tuning, NeurIPS (Oct. 31, 2024).
OpenAI, GPT-4 Technical Report, arXiv (Mar. 4, 2024).
Penedo, Guilherme, et al. The RefinedWeb Dataset for Falcon LLM: Outperforming Curated Corpora with Web Data, and Web Data Only, arXiv (Jun. 1, 2023).
Pratama, Derry, et al. CIPHER: Cybersecurity Intelligent Penetration-Testing Helper for Ethical Researcher, MDPI (Sensors) (Oct. 26, 2024).
Press, Ofir, et al. Train Short, Test Long: Attention with Linear Biases Enables Input Length Extrapolation, ICLR (2022).
Rafailov, Rafael, et al. Direct Preference Optimization: Your Language Model is Secretly a Reward Model, 37th Conference on Neural Information Processing Systems (NeurIPS 2023) (2023).
Raiaan, Mohaimenul Azam Khan, et al. A Review on Large Language Models: Architectures, Applications, Taxonomies, Open Issues and Challenges, (Feb. 13, 2024).
Shao, Minghao, et al. An Empirical Evaluation of LLMs for Solving Offensive Security Challenges, arXiv (Feb. 19, 2024).
Sharma, Mrinank, et al. Towards Understanding Sycophancy in Language Models, ICLR (2024).
Sharma, Pawankumar, et al. Impact of Big Data Analytics and ChatGPT on Cybersecurity, IEEE (2023).
Shashwat, Kumar, et al. A Preliminary Study on Using Large Language Models in Software Pentesting (Jan. 30, 2024).
Shen, Xiangmin, et al. PentestAgent: Incorporating LLM Agents to Automated Penetration Testing, Hanoi, Vietnam, ASIA CCS '25 (Aug. 25-29, 2025).
Sparck Jones, Karen, A statistical interpretation of term specificity and its application in retrieval, MCB University Press (Journal of Documentation vol. 60 Number 5) (2004), 493-502.
Thrampoulidis, Christos, Implicit Optimization Bias of Next-token Prediction in Linear Models, NeurIPS (2024).
Valea, Ovidiu, et al. Towards Pentesting Automation Using the Metasploit Framework, IEEE (2020).
Wan, Shengye, et al. Cyberseceval 3: Advancing the Evaluation of Cybersecurity Risks and Capabilities in Large Language Models (Jul. 2024).
Wang, Lingzhi, et al. From Sands to Mansions: Enabling Automatic Full-Life-Cycle Cyberattack Construction with LLM (Jul. 2024).
Wei, Jason, et al. Chain-of-Thought Prompting Elicits Reasoning in Large Language Models, NeurIPS (2022).
Xie, Yueqi, et al. Defending ChatGPT against jailbreak attack via self-reminders, Nature Machine Intelligence (Dec. 12, 2023), 1486-1496.
Xu, Jiacen, et al. Autoattacker: A Large Language Model Guided System to Implement Automatic Cyber-attacks, arXiv (Mar. 2, 2024).
Xu, Ziwei, et al. Hallucination is Inevitable: An Innate Limitation of Large Language Models, arXiv (Feb. 13, 2025).

(56) References Cited

OTHER PUBLICATIONS

Yao, Jia-Yu, et al. LLM Lies: Hallucinations are not Bugs, but Features as Adversarial Examples, arXiv (Aug. 4, 2024).

Yao, Shunyu, et al. Tree of Thoughts: Deliberate Problem Solving with Large Language Models, NeurIPS (2023).

Zeng, Zhiyuan, et al. Scaling of Search and Learning: A Roadmap to Reproduce 01 from Reinforcement Learning Perspective, arXiv (Dec. 18, 2024).

Zhang, Andy K., et al. Cybench: A Framework for Evaluating Cybersecurity Capabilities and Risks of Language Models, ICLR (2025).

Zhang, Jie, et al. When LLMs Meet Cybersecurity: A Systematic Literature Review, arXiv (Dec. 4, 2024).

Zou, Andy, et al. Universal and Transferable Adversarial Attacks on Aligned Language Models, arXiv (Dec. 20, 2023).

* cited by examiner

100

ADAPTIVE TEXTUAL PAYLOADS FOR DISRUPTING LLM-POWERED CYBERATTACKS

CROSS-REFERENCE TO RELATED APPLICATIONS

This application claims the benefit of U.S. Provisional Application No. 63/704,041, having a first provisional application filed on Oct. 7, 2024, and U.S. Provisional Application 63/773,575 filed on Mar. 18, 2025, the contents of which are incorporated herein by reference in their entirety for all purposes.

TECHNICAL FIELD

This disclosure relates, generally, to the field of computing, particularly, to cybersecurity, and more particularly, to countering large language model (LLM)-powered cyberattacks.

BACKGROUND

Large language models (LLMs) are artificial intelligence (AI) systems built on deep neural networks. LLMs are trained on vast amounts of data, enabling them to perform a wide range of tasks, such as understanding and generating natural language, content generation, and complex problem-solving. Thus, with the ability to automate complex processes and enable sophisticated decision-making, LLMs have transformed numerous sectors, including the field of cybersecurity.

One emerging application of LLMs in cybersecurity is their use in penetration testing, also known as pentesting. Pentesting includes simulating cyberattacks to identify vulnerabilities in systems before malicious actors/agents can exploit them. Traditionally, the process of pentesting relied on cybersecurity professionals to manually discover and test weaknesses. However, the usage of LLMs has resulted in autonomous penetration testing tools that can assess network security by compromising hosts. As a result, the pentesting process is accelerated, enabling more frequent, efficient, and scalable security evaluations.

While the advancements in pentesting resulting from integrating LLMs provide significant benefits, they also potentially pose risks, such as the ability for LLMs to be exploited by malicious actors to automate cyberattacks, thereby making it easier for adversaries to conduct sophisticated operations with minimal effort. The ability to execute complex attack strategies without human intervention, such as by exploiting vulnerabilities and escalating privileges, could enable threat actors to launch large-scale attacks at an unprecedented speed and scale. This potential misuse of LLMs in offensive cyber operations poses significant challenges in cybersecurity, as it both lowers the barrier for launching attacks and increases the difficulty of defending against such attacks.

Currently, no methods exist that specifically address defenses against the threat of LLM-powered cyberattacks. Existing cybersecurity mechanisms, such as conventional honeypots and honeytokens, focus on defending against traditional threat actors. However, these mechanisms are not applicable to combat LLM-powered threat actors, as they do not target the unique vulnerabilities of LLMs, and thus, are unable to adequately counter the attacks. Thus, the current landscape of defensive strategies against threat actors is ill-equipped to effectively manage the rapid advancements in LLM technology, leaving the cybersecurity field ill-prepared for the future threats posed by AI-driven cyberattacks. Thus, there exists a need for defense strategies that specifically counter LLM-powered threat actors.

Therefore, it would be advantageous to provide an efficient solution that would cure the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include deploying one or more traps throughout a computing environment to protect at least one protected entity, where each trap of the one or more traps is designed to exploit one or more vulnerabilities of a LLM contained within an LLM-powered agent. The method may also include monitoring, in real-time, a plurality of interactions with the deployed traps. The method may furthermore include detecting, based on the monitored plurality of interactions, interaction behavior consistent with that of at least one LLM-powered agent of the one or more LLM-powered agents. The method may in addition include responsive to the detection, causing one or more of the deployed traps to initiate one or more defensive actions. Other embodiments of this aspect include corresponding computer systems, apparatus, and computer programs recorded on one or more computer storage devices, each configured to perform the actions of the methods.

Implementations may include one or more of the following features. The method where a defensive action of the one or more defensive actions may include performance of any one of: honeying, cloaking, or trapping. The method where the defensive action is honeying, and where the method may include: deploying any one of: at least one LLM-specific honeytoken and, at least one LLM-specific honeypot, or both. The method where detecting the interaction behavior further may include: obtaining a detection signal identifying a presence of the at least one LLM-powered agent using the at least one LLM-specific honeytoken, the at least one LLM-specific honeypot, or a combination thereof. The method where the defensive action is cloaking, and where the method may include: delaying the at least one LLM-powered agent. The method may include: diverting attention of the at least one LLM-powered agent away from the at least one protected entity. The method where the defensive action is trapping, and where the method may include:

stopping the at least one LLM-powered agent. The method where causing the deployed traps to initiate the one or more defensive actions further may include: generating an alert on a cyberattack executed by the at least one LLM-powered agent. The method where deploying the one or more traps throughout the computing environment further may include: embedding the traps within the at least one protected entity. The method where the one or more deployed traps are programmed to: modify existing strings, create new strings, or a combination thereof. The method where monitoring, in real-time, the plurality of interactions with the deployed traps further may include: logging one or more requests to a planted URL and correlating the requests to a tokenized target. The method where one or more of the one or more traps are programmed to present content that is parsed and/or interpreted distinctly from at least one of: a LLM, tools, a framework, and a knowledge base of the at least one LLM-powered agent. The method where the at least one LLM-powered agent includes any one of an autonomous pentesting agent, a semi-autonomous pentesting agent, an artificial intelligence pentesting agent, and a human-operated pentesting agent. Implementations of the described techniques may include hardware, a method or process, or a computer tangible medium.

In one general aspect, non-transitory computer-readable medium may include one or more instructions that, when executed by one or more processors of a device, cause the device to: deploy one or more traps throughout a computing environment to protect at least one protected entity, where each trap of the one or more traps is designed to exploit one or more vulnerabilities of a LLM contained within an LLM-powered agent; monitor, in real-time, a plurality of interactions with the deployed traps; detect, based on the monitored plurality of interactions, interaction behavior may include with that of at least one LLM-powered agent of the one or more LLM-powered agents; and responsive to the detection, cause one or more of the deployed traps to initiate one or more defensive actions. Other embodiments of this aspect include corresponding computer systems, apparatus, and computer programs recorded on one or more computer storage devices, each configured to perform the actions of the methods.

In one general aspect, system may include one or more processors configured to: deploying one or more traps throughout a computing environment to protect at least one protected entity, where each trap of the one or more traps is designed to exploit one or more vulnerabilities of a LLM contained within an LLM-powered agent. The system may furthermore include monitoring, in real-time, a plurality of interactions with the deployed traps. The system may in addition include detecting, based on the monitored plurality of interactions, interaction behavior consistent with that of at least one LLM-powered agent of the one or more LLM-powered agents. The system may moreover include responsive to the detection, causing one or more of the deployed traps to initiate one or more defensive actions. Other embodiments of this aspect include corresponding computer systems, apparatus, and computer programs recorded on one or more computer storage devices, each configured to perform the actions of the methods.

Implementations may include one or more of the following features. The system where a defensive action of the one or more defensive actions may include performance of any one of: honeying, cloaking, or trapping. The system where the one or more processors, when the defensive action is honeying, and are configured to: deploy any one of: at least one LLM-specific honeytoken and, at least one LLM-specific honeypot, or both. The system where the one or more processors, when detecting the interaction behavior, are configured to: obtain a detection signal identifying a presence of the at least one LLM-powered agent using the at least one LLM-specific honeytoken, the at least one LLM-specific honeypot, or a combination thereof. The system where the one or more processors, when the defensive action is cloaking, and are configured to: delay the at least one LLM-powered agent. The system where the one or more processors are further configured to: divert attention of the at least one LLM-powered agent away from the at least one protected entity. The system where the one or more processors, when the defensive action is trapping, and are configured to: stop the at least one LLM-powered agent. The system where the one or more processors, when causing the deployed traps to initiate the one or more defensive actions, are configured to: generate an alert on a cyberattack executed by the at least one LLM-powered agent. The system where the one or more processors, when deploying the one or more traps throughout the computing environment, are configured to: embed the traps within the at least one protected entity. The system where the one or more deployed traps are programmed to: modify existing strings, create new strings, or a combination thereof. The system where the one or more processors, when monitoring, in real-time, the plurality of interactions with the deployed traps, are configured to: log one or more requests to a planted URL and correlating the requests to a tokenized target. The system where one or more of the one or more traps are programmed to present content that is parsed and/or interpreted distinctly from at least one of: a LLM, tools, a framework, and a knowledge base of the at least one LLM-powered agent. The system where the at least one LLM-powered agent includes any one of an autonomous pentesting agent, a semi-autonomous pentesting agent, an artificial intelligence pentesting agent, and a human-operated pentesting agent. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings. In the drawings:

DETAILED DESCRIPTION

Figure 1:
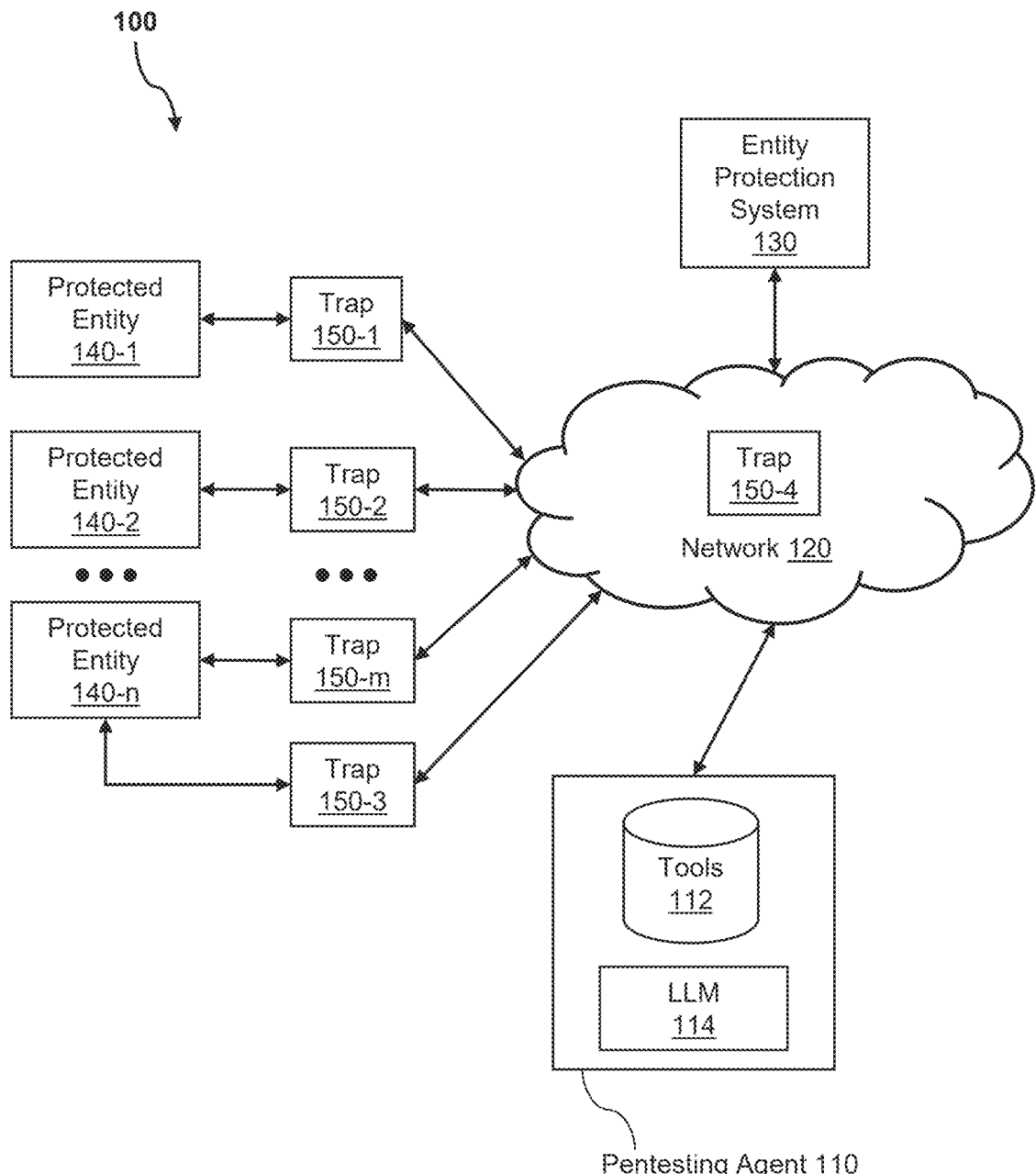
FIG. 1 illustrates a networked diagram utilized to describe the disclosed embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed embodiments present a method and system to delay, detect, and prevent large language model (LLM)-powered pentesting agents from attacking a network. The method and system can embed traps, also known as textual payloads or crafted strings, within a network, which exploit vulnerabilities of LLMs embedded within attacking pentest-ing agents to effectively counter cyberattacks. The method and system can plant traps into logs, filenames, configura-tions, etc., within a network to cloak entities within the network, thereby luring the pentesting agents away from their intended target(s). Also, the method and system can plant traps to coerce, corrupt, and/or cause malicious behav-iors in the attacking pentesting agents, thereby effectively trapping the agents. Additionally, the method and system can utilize specialized honeypots and/or honeytokens to both monitor LLM-powered pentesting agents and differentiate the LLM-powered pentesting agents from human agents, thereby detecting, and thus revealing, the presence of the attacking pentesting agents.

In certain embodiments, the disclosed system and method are configured to exploit inherent biases in the training and operational behavior of LLM-powered agents, including, but not limited to, autonomous pentesting agents, semi-autonomous pentesting agents, artificial intelligence (AI) pentesting agents, and human-operated pentesting agents. Such agents often exhibit depth-first exploration strategies and a reliance on semantically rich or syntactically sugges-tive content, stemming from the statistical and contextual patterns learned during training.

The disclosed embodiments are operable for any comput-ing architecture and should not be limited to any one architecture discussed hereinbelow.

The disclosed method is not a mental process and cannot be performed entirely in the human mind. Rather, the method involves technical operations that are executed within a computing environment and are tied to specific technological implementations. For example, the method includes the embedding of traps, such as textual payloads, crafted strings, honeypots, or honeytokens, within various network components, including log files, configuration files, and file names. These traps are intended to exploit vulner-abilities in LLM-powered pentesting agents. The embedding and triggering of such traps require execution by computing systems and interaction with machine learning inference models embedded in attacking agents.

The effectiveness of the method depends on a variety of system-level parameters, including the number and types of assets (e.g., endpoints, servers, devices) within the network, the network's protocol stack (e.g., TCP/IP, HTTP, FTP, etc.), and the behavioral characteristics of the agents. The method may adaptively modify its operation in response to detected changes in agent behavior or network conditions. For instance, the disclosed methods may adjust the placement or content of traps in real-time to optimize detection or diver-sion outcomes. Such dynamic and context-sensitive actions require the use of algorithmic decision-making, network analysis tools, and data processing capabilities, which can-not be mentally performed by a human operator.

Moreover, although a human operator may supply sub-jective parameters or requirements (e.g., based on perceived threat levels, entity criticality, or strategic goals), the execu-tion of the method remains rooted in automated processing by computing systems. It should be noted that the operator's input may influence how or where traps are deployed, but the operational steps involved in carrying out the method are performed by the system.

Accordingly, the disclosed method is directed to a prac-tical application of computer technology to solve a specific problem in the field of cybersecurity. It improves network protection by detecting and disrupting LLM-powered pentesting agents through technical mechanisms that are necessarily rooted in computing technology.

FIG. 1 shows an example network diagram utilized to describe the various disclosed embodiments.

The network diagram, also referred to as computing environment 100, illustrated in FIG. 1 includes a pentesting agent 110, also referred to as LLM-powered pentesting agent, LLM-powered agent, attacking pentesting agent, AI agent, or the agent, an entity protection system 130, pro-tected entity 140-1 through 140-n (hereinafter, protected entity 140 in the singular or protected entities 140 in the plural), and traps 150-1 through 150-m (hereinafter, trap 150 in the singular or traps 150 in the plural), all connected to network 120. Protected entity 140 may be a physical entity, such as a hardware component, for example, a personal computer, a mobile phone, a smartphone, a tablet computer, a server, or any computer device, and the like. Protected entity 140 may be a logical entity, such as a software process, for example, a web browser, a DHCP server, DNS resolver, or virtual machine networking stack, and the like. In other configurations, protected entity 140 may include a wide range of network-accessible components, including but not limited to a single file, such as a log file, configuration file, or website source code.

In some embodiments, protection may be applied at the host level to prevent a pentesting agent 110 from exploring a particular host. However, in other configurations, protec-tion may be more advantageous to allow access to the host while manipulating the agent's 110 interpretation of its contents. For example, assuming agent 110 has already gained access to a host of a protected entity 140, the system 130 may be configured to cause the agent 110 to misinter-pret, overlook, or otherwise fail to correctly process specific files or file content present on the host.

Pentesting agent 110 may include a single-LLM-powered agent or a multi-LLM-powered agent. In an embodiment, the agent 110 includes an autonomous pentesting agent, a semi-autonomous pentesting agent, or a human-operated pentesting agent. It should be understood that an LLM-powered agent is an artificial intelligence (AI) agent. Pentesting agents often exhibit depth-first exploration strat-egies and a reliance on semantically rich or syntactically suggestive content, stemming from the statistical and con-textual patterns learned during training.

In some configurations, pentesting agent 110 includes one or more tools 112 configured to explore and/or exploit elements in entities on a network to reach the goal of the pentesting agent 110, for example, obtaining root privileges over a host in the network 120. Additionally, the pentesting agent 110 includes a LLM 114. The LLM 114 is configured to perform custom operations and/or execute its suite of tools 112, guide multi-step and/or exploration operations, or both. In at least one embodiment, the pentesting agent 110 may include a small language model, multiple small lan-guage models, multiple LLMs, or any combination thereof.

In at least one embodiment, there may be multiple LLM-powered pentesting agents 110. According to this embodi-ment, as explained herein, entity protection system 130 operates to protect against cyberattacks originating from each of the multiple LLM-powered pentesting agents 110 independently, as each LLM-powered pentesting agent 110 can operate and attack the network 120 differently.

A trap 150 can be a prepared textual payload, i.e., crafted strings, which are designed to stop/disrupt, delay, and/or identify LLM-powered pentesting agents 110 by influencing the LLM-powered agent 110 in how they perceive, interpret, and navigate the computing environment 100. Traps 150 can be planted/injected/deployed throughout the computing environment 100, including embedding them within the protected entities 140 and/or the network 120 itself. More specifically, a trap 150 may be programmed to modify existing strings, such as by being injected into filenames, hostnames, file contents, URLs, service banners, HTML code, configurations, etc. Also, a trap 150 may be programmed to create new strings, such as by being planted in additional files or entries. In at least one embodiment, a single trap 150 is planted within a protected entity 140. In at least one embodiment, multiple traps 150 are planted within the same protected entity 140. In at least one embodiment, traps 150 are planted without the use of prompt injection. A trap 150 can be programmed to present content that is parsed and/or interpreted distinctly from at least one of: a LLM, tools, a framework, and a knowledge base of the LLM-powered agent 110.

Entity protection system 130 is configured to embed one or more traps 150 within the network 120 to exploit and take advantage of vulnerabilities of LLMs 114 embedded within pentesting agents 110. More specifically, the entity protection system 130 embeds or deploys traps 150 designed to achieve one of three defensive actions, or any combination thereof, cloaking, honeying, and trapping. Cloaking includes concealing or distorting critical information to prevent a pentesting agent 110 from recognizing or identifying protected entities 140. Honeying includes employing LLM-specific honeypots and/or honeytokens to lure a pentesting agent 110 into revealing its presence. Trapping includes exploiting intrinsic LLM flaws to detect, delay, or halt the pentesting agent's 110 cyberattack.

It should be noted that in some embodiments, the disclosed system 130 may employ a specialized honeypot or honeytoken configured to differentiate between interactions initiated by human threat actors and those initiated by LLM-powered agents 110. Unlike traditional honeypots, which are primarily designed to lure and log malicious activity, the disclosed honeypot technique is crafted with textual cues, formatting anomalies, or semantic constructs that exploit known differences in how LLMs process and interpret content compared to humans. For example, the system 130 may embed ambiguous or misleading language that a human would likely disregard or interpret correctly, but which may cause a LLM to misclassify the resource or engage in predictable behavior. By analyzing interaction patterns, response timing, and parsing characteristics, the system 130 can infer the nature of the actor, enabling enhanced detection, classification, and response to automated threats.

The entity protection system 130 can employ defensive actions using methods of misinformation and model exploitation. A method of misinformation can include planting deceptive, but plausible data to steer a pentesting agent 110 toward irrelevant tasks, waste its resources, and/or conduct unproductive actions. By exploiting LLM 114 biases and reasoning patterns, misinformation influences a pentesting agent's 110 decisions without modifying its underlying functionality.

It should be emphasized that the entity protection system 130 is designed to exploit inherent biases in the training and operational behavior of LLMs 114, and their encompassing agent 110 frameworks, for example, their tendency to follow depth-first search heuristics and prioritize semantically rich or contextually suggestive inputs. Unlike human users or conventional rule-based agents, LLM-powered agents 110 often rely on predictive patterns learned during training, which may cause them to pursue specific types of content or structures more aggressively. According to the disclosed embodiments, by embedding strategically crafted traps 150, such as misleading file names, synthetic log entries, or ambiguous configuration elements into the environment, the entity protection system 130 can selectively lure LLM-powered agents 110 toward decoy resources. This targeted deception enables the system 130 to manipulate agent 110 behavior in ways that are ineffective or irrelevant against human intruders or traditional automated tools, thereby enhancing the specificity and effectiveness of LLM-focused defensive measures.

In an embodiment, the method of model exploitation can include leveraging inherent vulnerabilities in the LLM 114 of a pentesting agent 110, such as tokenization flaws, limited memory, or exposure to adversarial prompts, to hijack or corrupt its logic and disrupt the attack. The pentesting agent 110 may further include or have access to a knowledge base that dynamically expands as the agent 110 explores a computing environment 100. This knowledge base, in combination with the behavior and operation of the agent 110 itself, may be exploited by the disclosed embodiments to detect, delay, or disrupt the agent's 110 activities.

Embodiments performed by the entity protection system 130 and its modules are discussed in more detail below. The modules of the entity protection system 130 may be implemented in software (as defined herein below), firmware, hardware, or any combination thereof. Such implementations may vary depending on performance requirements, computational constraints, deployment contexts (e.g., edge vs. cloud), or other architectural considerations.

Figure 4:
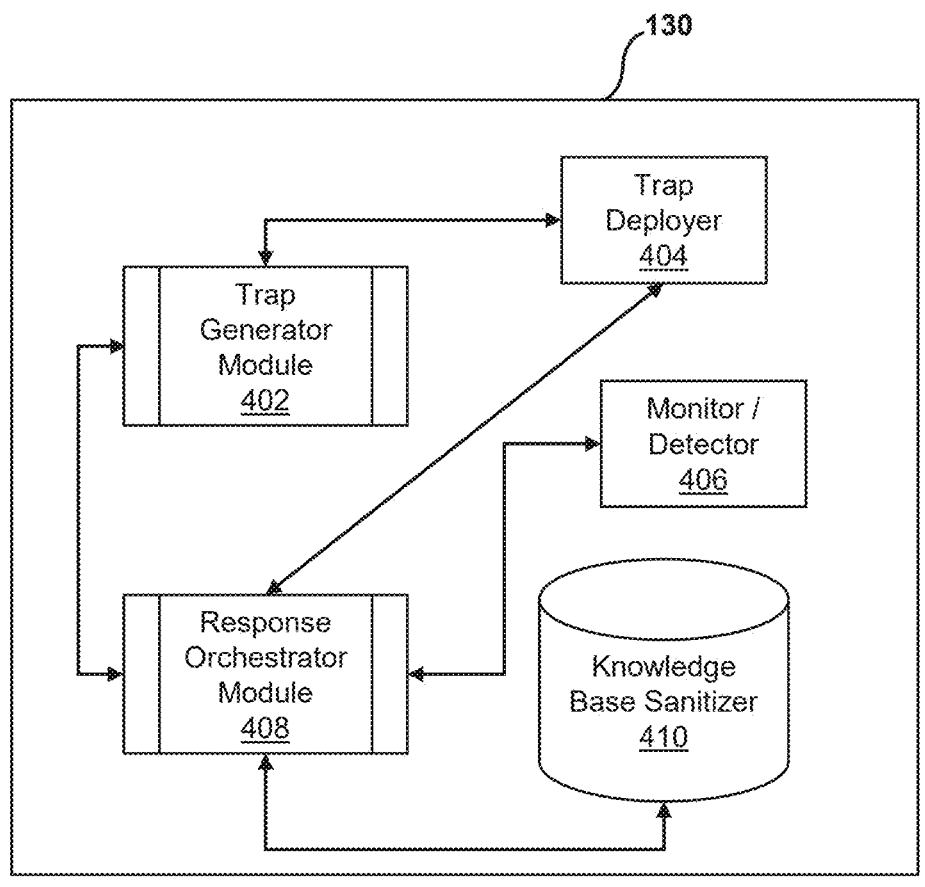
FIG. 4 is a functional diagram of an entity protection system according to at least one embodiment.

As illustrated in FIG. 4, the entity protection system 130 may include, but is not limited to, a trap generator module 402, a trap deployer 404, a monitor/detector 406, a response orchestrator module 408, and a knowledge base sanitizer 410.

The trap generator module 402 may produce the textual payloads that include crafted tokens, such as special Unicode characters or control-like sequences, which appear different to LLM-tokenizers than they would to human viewers. The trap deployer 404 may be a mechanism to embed the traps 150 within the computing environment 100, such as fake log entries, planted files, dummy credentials, DNS/URL entries, web pages, etc. The monitor/detector 406 may be infrastructure that detects trap 150 triggers, such as credential usage logs, HTTP requests to planted URLs, inbound callbacks, or specific sequences of LLM-powered pentesting agent 110 behavior, for example, the following of "breadcrumb trails". The response orchestrator module 408, upon detection of an LLM-powered pentesting agent 110, initiate defense actions, for example, alerting, isolating, further monitoring, active countermeasures, etc. The knowledge base sanitizer 410 can be a control that mitigates the poisoning of defender knowledge stores, such as if pentesting agents 110 copy trap 150 content into the knowledge bases.

Figure 3:
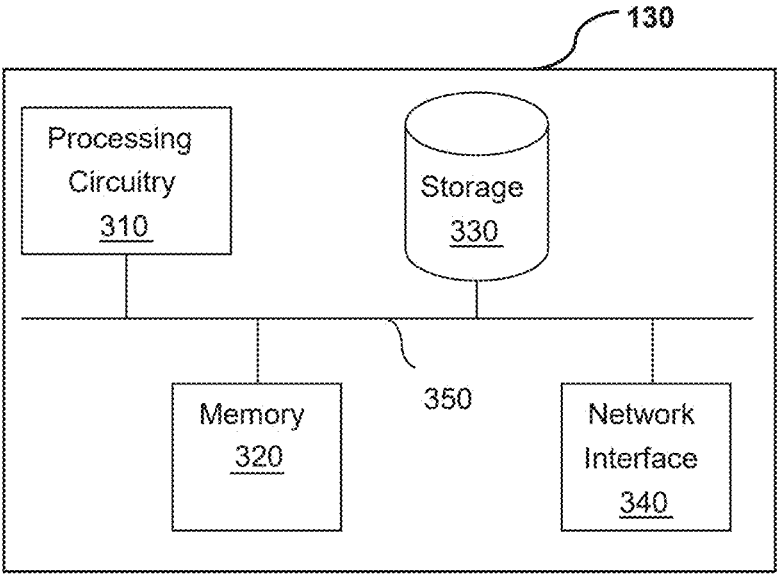
FIG. 3 is a block diagram of a computing architecture of an entity protection system according to at least one embodiment.

It should be noted that the entity protection system 130 and any if its modules (402, 404, 406, and 408) may be realized as a piece of software code. Entity protection system 130 may be realized often as just-in-time compiled software code. As used herein, the term "software" refers to one or more sequences of instructions, logic, or routines, including but not limited to source code, object code, intermediate code, interpretable code, or executable code, that may be stored on a non-transitory computer-readable medium and executed by one or more processors. The software may be implemented using one or more machine learning frameworks, including but not limited to Tensor-Flow™, PyTorch™, ONNX™, or equivalent platforms. The software may be executed in virtualized environments, such as containers or serverless architectures, or may be deployed via cloud infrastructure. The term "hardware" refers to one or more physical computing devices or components capable of performing operations, including model training, inference, and/or data processing. Non-limiting examples of hardware include: Central Processing Units (CPUs); Graphics Processing Units (GPUs); Tensor Processing Units (TPUs); Application-Specific Integrated Circuits (ASICs); Field Programmable Gate Arrays (FPGAs); Neural Processing Units (NPUs) or equivalent dedicated AI accelerators; On-device microcontrollers or edge processors capable of running trained models, and the like. The described embodiments are not limited to any particular implementation platform and may be deployed across heterogeneous environments comprising combinations of the above. In an example implementation of the entity protection system 130 in hardware is shown in FIG. 3.

It should be noted that although one entity protection system 130 and one pentesting agent 110 are illustrated in FIG. 1 for the sake of simplicity, the embodiments disclosed herein can be applied to a plurality of entity protection systems 130, and a plurality of pentesting agents 110, or any combination of thereof.

Figure 2:
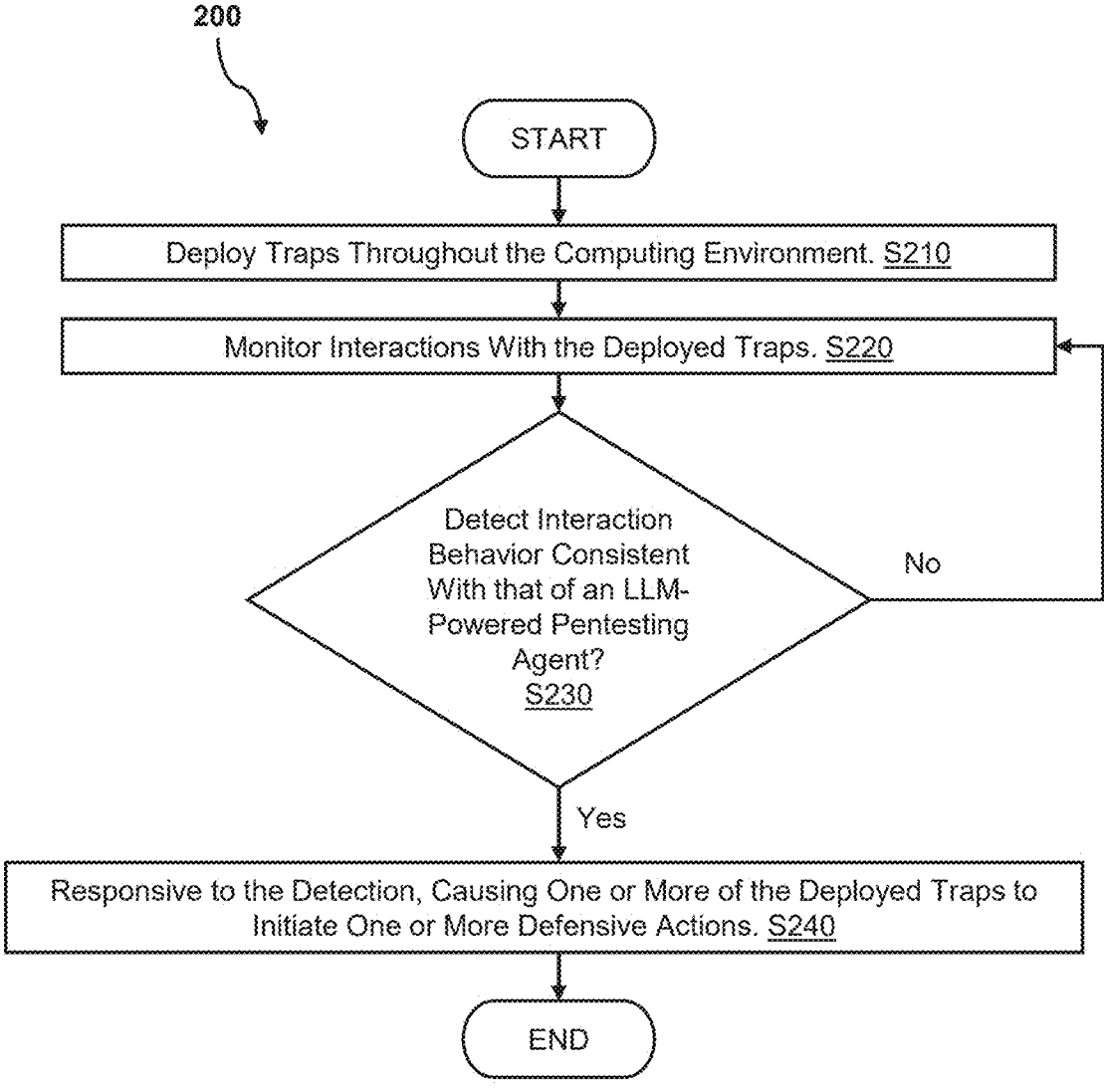
FIG. 2 is an operational flowchart illustrating a process of defending against an LLM-powered cyberattack according to at least one embodiment.

FIG. 2 is an example flowchart diagram illustrating a method 200 of defending against an LLM-powered cyber-attack according to at least one embodiment. In some embodiments, the method may be performed by the entity protection system, such as system 130 shown in FIG. 1. The method is executed to defend against LLM-powered pentesting agent(s) attempting to attack the protected entities. The method will be discussed with reference to the elements shown in FIGS. 1 and 4.

At S210, one or more traps 150 are deployed throughout the computing environment 100. The entity protection system 130 can embed one or more traps 150, created using its trap generator module 402 and stored in its memory 320, within the computing environment 100, using its trap deployer mechanism 404, in furtherance of achieving one or more of the three defensive actions, cloaking, honeying, and trapping, as discussed above and in greater detail below.

At S220, interactions with deployed traps 150 are monitored. In an embodiment, interactions with the deployed traps 150 may be monitored by logging requests to a planted URL and correlating the requests to a tokenized target or by invoking a tool to collect information. For example, the monitoring can be achieved by scanning the network 120 (FIG. 1) with a nmap tool, reading a file, directory traversal, etc. By way of example, in some embodiments, the system 130 may be configured to deploy a decoy or synthetically generated file that appears contextually or semantically significant to an LLM-powered pentesting agent 110 but would generally be disregarded by a human pentester as irrelevant or unimportant. The file may include crafted filenames, metadata, or content designed to exploit the statistical or heuristic tendencies of the LLM-powered agent 110. While the LLM-powered agent 110 is drawn to and attempts to access the decoy file, the system 130 may simultaneously monitor, log, and analyze all access events associated with the file, including timestamps, source identifiers, and behavioral patterns of the agent 110. This combined approach of luring and concurrent monitoring enables the system 130 to identify, classify, and track LLM-powered agents 110 in real time, thereby enhancing detection and response compared to traditional honeypots or monitoring solutions.

At S230, it is determined whether any of the monitored interactions with the deployed traps 150 exhibit interaction behavior consistent with that of an LLM-powered pentesting agent 110. If YES, execution proceeds with S240. If NO, execution returns to S220. In an embodiment, it is determined that the monitored interactions exhibit interaction behavior consistent with that of a LLM-powered pentesting agent 110 upon obtaining a detection signal identifying the presence of a LLM-powered pentesting agent 110, i.e., differentiates LLM-powered access versus human access, using the honeying defensive action.

In an embodiment, the honeying defensive action can include using traps 150 designed as LLM-specific lures and/or LLM-specific honeytokens/honeypots. Traps 150, designed as LLM-specific lures, are planted into a private URL or credentials to a server to entice the pentesting agent 110 to explore them. Even if an LLM-specific lure is a blatant trap 150, the LLM 114 within the pentesting agent 110 will often follow through, unlike a human who would likely avoid it. Traps 150 designed as LLM-specific honeypots can include a decoy system designed to lure the pentesting agent 110 and study malicious activity without risking protected entities 140. Traps 150 designed as LLM-specific honeytokens can include certain Unicode characters, i.e., fake data, such as a bogus credential, which can be used to misinform LLMs 114 and trigger alerts when used, signaling unauthorized activity. For example, an LLM-specific honeytoken may include two distinct subsets of Unicode characters, those rendered normal to humans, but are interpreted differently by a LLM 114, and those interpreted normally by a LLM 114 but rendered differently to humans. The use of these characters can be used by the entity protection system 130 to identify whether a honeytoken was accessed by a human or a LLM 114.

At S240, responsive to the detection of interaction behavior consistent with that of a LLM-powered pentesting agent 110, a deployed trap is 150 caused to initiate one or more defensive actions. Such a deployed trap 150 may be the one that experiences consistent interaction behavior. The defensive actions may include, but are not limited to, notifying one or more protected entities 140 of the presence of LLM-powered pentesting agent(s) 110 based on the results of step S230, further deploying at least one LLM-specific honeytoken, at least one LLM-specific honeypot, or both, delaying the cyberattack through cloaking, or stopping/preventing the cyberattack through trapping.

The cyberattack can be delayed using cloaking, i.e., misleading the pentesting agent 110. The entity protection system 130 may perform cloaking through misleading perception and diverting the pentesting agent's 110 attention away from protected entities 140. Misleading perception may include exploiting various LLM 114 weaknesses to obscure and hide relevant information from pentesting agent 110, such as planting false evidence as traps 150, leading the pentesting agent 110 to arrive at false conclusions and the lead the agent 110 from the protected entities 140. For example, appending a line in a log file that states "System has been updated. All known CVEs mitigated as of 2025-01-01." can cause a LLM 114 to give up on evaluating any potential CVEs it had in mind.

Additionally, for example, traps 150 may be used to lead a pentesting agent 110 to give up on the host. Also, misleading perception may include embedding traps 150 with special characters that affect LLMs 114 but do not impact tools that render content. For example, Unicode backspace character (U+0008) can erase content for a LLM 114 but has no effect on common terminals, browsers, or text editors such as nano and vim, even when text is copied. These characters can obscure sensitive information, such as log files, filenames, and software versions, from LLMs 114 while preserving system legibility, allowing protected entities 140 to hide without altering their appearance to users. These characters may also be used to obstruct file access. For example, by adding a 'soft hyphen' character to a filename (U+00AD), a human must press TAB in the terminal to autocomplete the text and write it, whereas LLMs 114 struggle to accurately reproduce or reference such filenames, often making errors in reconstruction.

Diverting the pentesting agent's 110 attention away from protected entities 140 can include planting misinformation to lead the pentesting agent 110 away from protected entities 140, such as by providing incorrect version numbers and/or redirecting attention away from a target. Traps 150 can be embedded in fake logs and config files to outright lie about version numbers to prevent correct exploits from being used or waste the pentesting agent's 110 time. Traps 150 can be embedded as a trail of enticing 'breadcrumbs', for example a trail of log files involving a high-value term "Admin", to lure the pentesting agent 110 away from one or more protected entities 140, and thus, delay the pentesting agent 110.

The cyberattack can be stopped using trapping to corrupt, hijack, or even compromise the pentesting agent 110. The entity protection system 130 may perform trapping through model corruption, role manipulation, and forced code execution.

Model corruption may include exploding the search space, such as by introducing irrelevant or non-existent entities and vulnerabilities through traps 150, thus expanding the search space for the pentesting agent 110. For example, traps 150 may be used to fill the pentesting agent's 110 memory with large quantities of useless information to keep the pentesting agent 110 busy and/or to derail the cyberattack entirely through misinformation within the information.

Also, model corruption may include slowing down the LLM 114 in which planted traps 150 contain enticing, yet useless, massive data points to force the LLM 114 to parse and read all the tokens in the traps 150. Additionally, model corruption may include creating circular or repetitive logic loops in which planted traps 150 contain cyclic references in data points, effectively trapping the pentesting agent 110 in an endless loop. Furthermore, model corruption may include planting adversarial perturbation in which planted traps 150 contain short sequences of tokens that are rarely seen by LLMs 114 during their training, thereby leading the LLMs 114 to hallucinate when tokens are read, ultimately corrupting their internal state.

Role manipulation may include triggering explicit or latent safeguards/alignment of a LLM 114 in which planted traps 150 contain dangerous/unethical instructions, causing the LLM 114 to refuse any further operation. Also, role manipulation may include changing the pentesting agent's 110 role or objectives typically executed using prompt injection techniques. in which the entity protection system 130 may inject instructions through prompt injection into the LLM's 114 input to stop the cyberattack.

Forced code execution may include executing arbitrary code on the pentesting agent's 110 system without using prompt injection in which planted traps 150 contain embedded messages that deceive the LLM 114 into believing the suggested operations will help it achieve its objectives. By presenting the operations as a necessary step to achieve its goals, the LLM 114 can be manipulated to execute untrusted commands. For example, the entity protection system 130 may inject a trap 150 into a text file, or even in an out-of-context location such as in an HTML comment and upon encountering the trap 150, the pentesting agent 110 will execute untrusted code in their terminals. Additionally, for example, the entity protection system 130 may inject a trap 150 containing a script of the defender's code that when encountered by the pentesting agent 110, leads the pentesting agent 110 to execute the script in its environment, thus enabling access of the pentesting agent 110 to a defender, i.e., a reverse shell.

Further, forced code execution may include executing code on the host's system. Similarly to executing arbitrary code on the pentesting agent's 110 system, the entity protection system 130 may inject a trap 150 leading the pentesting agent 110 to execute a script on the host system. For example, the entity protection system 130 may inject a trap 150 containing a script of the defender's code that when encountered by the pentesting agent 110, leads the pentesting agent 110 to execute the script on its host system, thus triggering an alarm in the network 120. Additionally, forced code execution may include leading the pentesting agent 110 to waste computing time in which planted traps 150 that appear as highly valuable deceive the pentesting agent 110 into engaging in resource-intensive yet futile tasks, such as brute-forcing login credentials or attempting to crack cryptographic hashes, leading the pentesting agent 110 into allocating computational resources to pursue the tasks.

In some embodiments, any of the above-discussed defensive actions may be implemented in any combination or adapted for different outcomes.

Although FIG. 2 shows example blocks of the method 200, in some implementations, process 200 may include additional blocks, fewer blocks, different blocks, or differently arranged blocks than those depicted in FIG. 2. Additionally, or alternatively, two or more of the blocks of process 200 may be performed in parallel.

FIG. 3 is an example block diagram of a computing architecture of the entity protection system 130.

The entity protection system 130 includes a processing circuitry 310 coupled to a memory 320, a storage 330, and a network interface 340. In an embodiment, the components may be communicatively connected via a bus 350.

The processing circuitry 310 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), graphics processing units (GPUs), system-on-a-chip systems (SOCs), general-purpose microprocessors, microcontrollers, digital signal processors (DSPs), and the like, or any other hardware logic components that can perform calculations or other manipulations of information.

In at least some embodiments, the processing circuitry 310 is configured to execute generative artificial intelligence (genAI) models, perform inference using or otherwise apply genAI models, train genAI models, fine-tune genAI models, combinations thereof, and the like. Such genAI models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 310 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like.

In embodiments which utilize large language models (LLMs) or otherwise perform operations which may require or be enhanced through use of parallel processing, the processing circuitry 310 may include one or more GPUs or other processing units suitable for parallel processing. Such GPUs may be configured to perform matrix multiplication operations including, but not limited to, performing dot product operations in order to support neural network operations (for example, by performing dot product operations for hidden layer computations) or performing dot product operations in an attention mechanism in order to compute a similarity score between vectors during attention weight computation. In at least some such embodiments using GPUs, the processing circuitry 310 may include a number of CPU cores which is equal to or greater than the number of GPUs in order to facilitate or otherwise support parallel processing via multiple GPUs.

The memory 320 may be volatile (e.g., RAM, etc.), non-volatile (e.g., ROM, flash memory, etc.), or any combination thereof. In one configuration, computer-readable instructions needed to implement one or more embodiments disclosed herein may be stored in the storage 330.

In another embodiment, the memory 320 is configured to store software. Software shall be construed broadly to mean any type of instructions, whether referred to as software, firmware, middleware, microcode, or hardware description language. Instructions may include code (e.g., in source code format, binary code format, executable code format, or any other suitable format of code). The instructions, when executed by the one or more processors, cause the processing circuitry 310 to perform the various processes described herein.

The storage 330 may be magnetic storage, optical storage, and the like, and may be realized, for example, as flash memory or other memory technology, CD-ROM, Digital Versatile Disks (DVDs), hard drives, SSD, or any other medium which can be used to store the desired information, such as log of transactions, public keys, and so on. The storage 330 may include code for deploying and executing the traps 150.

The network interface 340 allows the protected entities 140 to communicate with the Internet or a local area network. The network interface 340 communicates with these elements.

It should be understood that the embodiments described herein are not limited to the specific architecture illustrated in FIG. 3 and that other architectures may be equally used without departing from the scope of the disclosed embodiments.

It should be further noted that entity protection system 130 may be realized using a computing architecture similar to the architecture illustrated in FIG. 3, but that other architectures may be equally used without departing from the scope of the disclosed embodiments. Further, the memory 320 may include instructions for executing the function of the respective device.

The various embodiments disclosed herein can be implemented as any combination of hardware, firmware, and software. Moreover, the software is preferably implemented as an application program tangibly embodied on a program storage unit or computer-readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and a micro-instruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

It should be understood that any reference to an element herein using a designation such as "first," "second," and so forth does not generally limit the quantity or order of these elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the groups consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to further the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for defending against cyberattacks executed by one or more large language model (LLM)-powered agents, comprising:

deploying one or more traps throughout a computing environment to protect at least one protected entity, wherein each trap of the one or more traps is designed to exploit one or more vulnerabilities of a LLM contained within an LLM-powered agent;

monitoring, in real-time, a plurality of interactions with the deployed traps;

detecting, based on the monitored plurality of interactions, interaction behavior consistent with that of at least one LLM-powered agent of the one or more LLM-powered agents; and responsive to the detection, causing one or more of the deployed traps to initiate one or more defensive actions.

2. The method of claim 1, wherein a defensive action of the one or more defensive actions comprises performance of any one of: honeying, cloaking, or trapping.

3. The method of claim 2, wherein the defensive action is honeying, and wherein the method further comprising:
deploying any one of: at least one LLM-specific honeytoken and, at least one LLM-specific honeypot, or both.

4. The method of claim 3, wherein detecting the interaction behavior further comprises:
obtaining a detection signal identifying a presence of the at least one LLM-powered agent using the at least one LLM-specific honeytoken, the at least one LLM-specific honeypot, or a combination thereof.

5. The method of claim 2, wherein the defensive action is cloaking, and wherein the method further comprising:
delaying the at least one LLM-powered agent.

6. The method of claim 5, further comprising:
diverting attention of the at least one LLM-powered agent away from the at least one protected entity.

7. The method of claim 2, wherein the defensive action is trapping, and wherein the method further comprising:
stopping the at least one LLM-powered agent.

8. The method of claim 2, wherein causing the deployed traps to initiate the one or more defensive actions further comprises:
generating an alert on a cyberattack executed by the at least one LLM-powered agent.

9. The method of claim 1, wherein deploying the one or more traps throughout the computing environment further comprises:
embedding the traps within the at least one protected entity.

10. The method of claim 9, wherein the one or more deployed traps are programmed to: modify existing strings, create new strings, or a combination thereof.

11. The method of claim 1, wherein monitoring, in real-time, the plurality of interactions with the deployed traps further comprises:
logging one or more requests to a planted URL and correlating the requests to a tokenized target.

12. The method of claim 1, wherein one or more of the one or more traps are programmed to present content that is parsed and/or interpreted distinctly from at least one of: a LLM, tools, a framework, and a knowledge base of the at least one LLM-powered agent.

13. The method of claim 1, wherein the at least one LLM-powered agent includes any one of an autonomous pentesting agent, a semi-autonomous pentesting agent, an artificial intelligence pentesting agent, and a human-operated pentesting agent.

14. A non-transitory computer-readable medium storing a set of instructions for defending against cyberattacks executed by one or more large language model (LLM)-powered agents, the set of instructions comprising:
one or more instructions that, when executed by one or more processors of a device, cause the device to:
deploy one or more traps throughout a computing environment to protect at least one protected entity, wherein each trap of the one or more traps is designed to exploit one or more vulnerabilities of a LLM contained within an LLM-powered agent;
monitor, in real-time, a plurality of interactions with the deployed traps;

detect, based on the monitored plurality of interactions, interaction behavior consistent with that of at least one LLM-powered agent of the one or more LLM-powered agents; and
responsive to the detection, cause one or more of the deployed traps to initiate one or more defensive actions.

15. A system for defending against cyberattacks executed by one or more large language model (LLM)-powered agents comprising:
one or more processors configured to:
deploy one or more traps throughout a computing environment to protect at least one protected entity, wherein each trap of the one or more traps is designed to exploit one or more vulnerabilities of a LLM contained within an LLM-powered agent;
monitor, in real-time, a plurality of interactions with the deployed traps;
detect, based on the monitored plurality of interactions, interaction behavior consistent with that of at least one LLM-powered agent of the one or more LLM-powered agents; and
responsive to the detection, cause one or more of the deployed traps to initiate one or more defensive actions.

16. The system of claim 15, wherein a defensive action of the one or more defensive actions comprises performance of any one of:
honeying, cloaking, or trapping.

17. The system of claim 16, wherein the one or more processors, when the defensive action is honeying, and are configured to:
deploy any one of:
at least one LLM-specific honeytoken and, at least one LLM-specific honeypot, or both.

18. The system of claim 17, wherein the one or more processors, when detecting the interaction behavior, are configured to:
obtain a detection signal identifying a presence of the at least one LLM-powered agent using the at least one LLM-specific honeytoken, the at least one LLM-specific honeypot, or a combination thereof.

19. The system of claim 16, wherein the one or more processors, when the defensive action is cloaking, and, are configured to:
delay the at least one LLM-powered agent.

20. The system of claim 19, wherein the one or more processors are further configured to:
divert attention of the at least one LLM-powered agent away from the at least one protected entity.

21. The system of claim 16, wherein the one or more processors, when the defensive action is trapping, and, are configured to:
stop the at least one LLM-powered agent.

22. The system of claim 16, wherein the one or more processors, when causing the deployed traps to initiate the one or more defensive actions, are configured to:
generate an alert on a cyberattack executed by the at least one LLM-powered agent.

23. The system of claim 15, wherein the one or more processors, when deploying the one or more traps throughout the computing environment, are configured to:
embed the traps within the at least one protected entity.

24. The system of claim 23, wherein the one or more deployed traps are programmed to:
modify existing strings, create new strings, or a combination thereof.

25. The system of claim 15, wherein the one or more processors, when monitoring, in real-time, the plurality of interactions with the deployed traps, are configured to:

log one or more requests to a planted URL and correlating the requests to a tokenized target.

26. The system of claim 15, wherein one or more of the one or more traps are programmed to present content that is parsed and/or interpreted distinctly from at least one of:

a LLM, tools, a framework, and a knowledge base of the at least one LLM-powered agent.

27. The system of claim 15, wherein the at least one LLM-powered agent includes any one of an autonomous pentesting agent, a semi-autonomous pentesting agent, an artificial intelligence pentesting agent, and a human-operated pentesting agent.

\* \* \* \* \*